May 12, 1936.  H. W. GROTE  2,040,770
PROCESS OF FORMING AGGLOMERATED CARBON BLACK
Filed Aug. 22, 1935
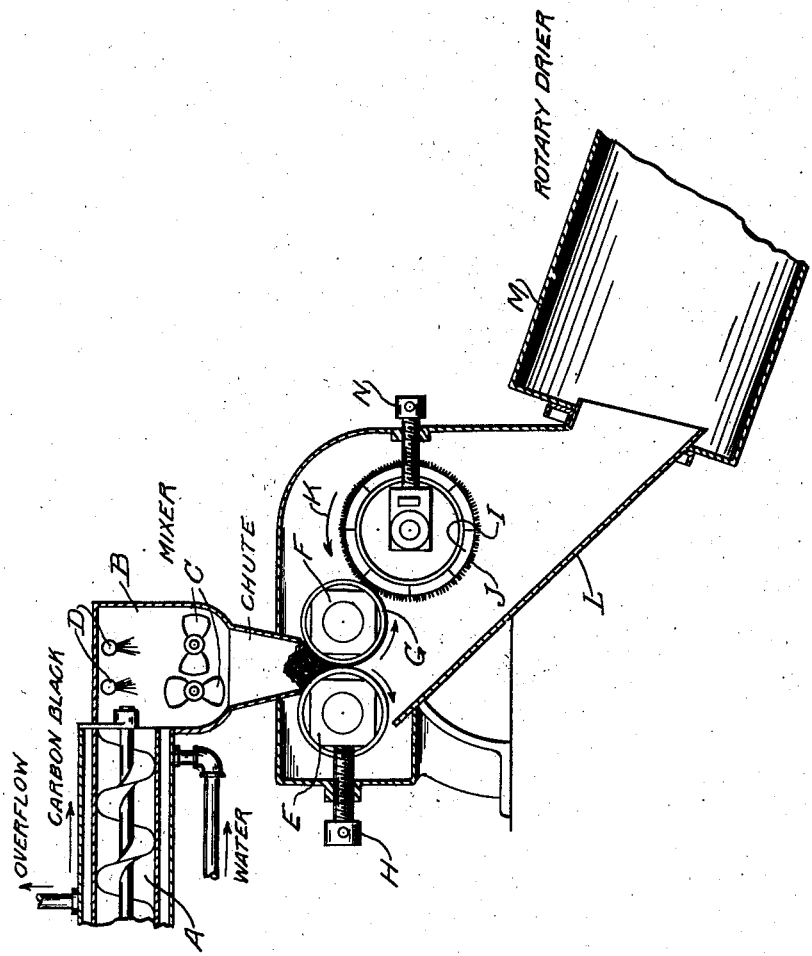
INVENTOR.
H. W. Grote
BY Foster + Codina
ATTORNEYS.

Patented May 12, 1936

2,040,770

UNITED STATES PATENT OFFICE 2,040,770

PROCESS OF FORMING AGGLOMERATED CARBON BLACK

Hans Walter Grote, Charleston, W. Va., assignor to United Carbon Company, Inc., Baltimore, Md., a corporation of Maryland

REISSUED
MAR 12 1940

Application August 22, 1933, Serial No. 686,311

3 Claims. (Cl. 134—60)

The present invention relates to the production of agglomerates or shaped masses of carbon block, for the purpose of overcoming some of the objectionable properties of raw carbon black, such as the formation of dust, during the handling of the same, during the mixing of the same with rubber or other materials, and for producing a product which is easier to handle. As is well known, carbon black in its original form is a powdery more or less lumpy material constituted of extremely small particles, so that during the handling of the same, air currents may blow the same about to some extent, and the object of the present invention is to produce agglomerates which will be free from the said objection.

In accordance with the present invention, the carbon black is moistened with a volatile liquid, e. g. alcohol, benzol, gasoline, methanol and acetone, but for which purpose water is entirely suitable, the mass is stirred and kneaded, to form a rather stiff paste, which is friable in character. The said paste is then worked upon an ordinary roller mill, for example a mill consisting of two horizontal rollers rotating in a vertical plane, the rollers may be operated at sightly different surface speeds, in order to cause the roll-milled material to adhere to one of the rollers, as a compacted layer. When this has been accomplished, another roller carrying needles or other points of similar character is rotated in such a position that the needles will scratch off the material on the roller, thereby producing shaped masses of the carbon black, which are then subjected to a high temperature drying operation, preferably at a temperature very much above the boiling point of the volatile solvent employed.

The dried material so produced can then be passed over a series of sieves in order to separate the same into different sizes, as required for different particular purposes for which the carbon black is to be employed.

For carrying out the process of the present application, an apparatus can be employed such as is shown diagrammatically in the annexed drawing, the figure representing a sectional elevation of suitable apparatus. It is to be understood however that this apparatus is shown merely for the purpose of illustration, and not as limiting the scope of the invention thereto.

In carrying out the process of the present invention, the carbon black may be fed through a conveyor A, which may be water-jacketed if desired for cooling purposes, the carbon black falling into the mixer B which may be a trough-shaped device, having agitators also acting as propellers C. Jets of a suitable vapor or liquid or mist are directed upon the material from the sprayers or perforated pipes D, and the proportion of the liquid used should be such as to give a very friable relatively dry pasty mass, in the mixer B.

From the bottom of the mixer B, the pasty mass is discharged through the chute illustrated, or in any other manner, into the space between the rolls of a roller mill, shown at E and F. These rolls rotate, in the direction of the arrows shown, the peripheral speed of one roller may be slightly greater than that of the other so that the moistened carbon forms in a layer G, upon the roller F. The thickness of this layer will be regulated by the space between the two rollers this being adjustable by means of a screw shown conventionally at H.

At I is shown a rapidly rotating roller, which can rotate for example in the direction shown by the arrow K, the surface of the roller carrying a great number of small needle-shaped spikes J. These needles, which are distributed over the entire face of the roller I, scratch off the layer or cake of compressed moistened carbon from the surface of the roller F, this then flowing down through the chute L, into the upper end of a rotary drier M, in which the material is dried by being subjected to gases at a high temperature, say 400 to 500° F. in order to rapidly dry the same, and leave the desirable porous friable structure of the finished material.

The roller I should be situated near enough to the roller F so that the needles will scrape off substantially the whole of the layer of carbon therefrom, the position of said roller being adjusted by means of a screw shown at N, or otherwise. The closeness together of the needles J will regulate the size of the particles torn off in this manner, which particles will of course be of more or less irregular shape.

After the drying operation the granular material can be passed over a series of sieves, to separate the same into different particle sizes, and any particles which are too small for use, as well as any particles which are too large for use, can be reintroduced through the conveyer A into the mixer B.

The particle size will be in part regulated by the thickness of the layer G on the roller F, and for ordinary purposes I find that this layer can be from a sixteenth of an inch in thickness to a quarter of an inch, but I do not restrict myself to these limits. If any of the moistened carbon is left on the roller F, after passing the roller I, this does no particular harm and will bond with a subsequently applied layer of the paste, to be scratched off during a subsequent rotation of the roller.

The proportion of water or other liquid introduced into the carbon black in the mixer B is subject to variation, and for ordinary purposes I find that about 40% of moisture is very satisfactory. This figure however is given merely by way of illustration without restricting the invention thereto.

I claim:—

1. The process of converting finely divided and dusty carbon black into a product which is substantially dustless, comprising moistening carbon black with a volatile liquid, forming a thin sheet of the moistened carbon black, subdividing said sheet into small irregularly shaped masses of carbon black agglomerates and drying the said masses, whereby a granular product is formed which is substantially dustless.

2. The process of converting finely divided and dusty carbon black into a product which is substantially dustless, comprising moistening the carbon black with water to form a stiff, pasty mass, forming a compressed sheet of the moistened carbon black, subdividing said sheet into small irregularly shaped masses of carbon black agglomerates and drying the said masses, whereby a granular product is formed which is substantially dustless.

3. The process of converting finely divided and dusty carbon black into a product which is substantially dustless, comprising moistening carbon black with water, the amount of water being about 40% of the moistened mass, forming a compressed thin sheet of the moistened carbon black, subdividing said sheet into small irregularly shaped masses of carbon black agglomerates and drying the said masses, whereby a granular product is formed which is substantially dustless.

HANS WALTER GROTE.